US010990202B2

(12) United States Patent
Böckem

(10) Patent No.: US 10,990,202 B2
(45) Date of Patent: Apr. 27, 2021

(54) STYLUS HAVING DISTANCE METER

(71) Applicant: LEICA GEOSYSTEMS AG, Heerbrugg (CH)

(72) Inventor: Burkhard Böckem, Jonen AG (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/653,498

(22) Filed: Oct. 15, 2019

(65) Prior Publication Data

US 2020/0319726 A1  Oct. 8, 2020

(30) Foreign Application Priority Data

Oct. 16, 2018 (EP) ..................................... 18200805

(51) Int. Cl.
| | | |
|---|---|---|
| *G06F 1/16* | (2006.01) | |
| *G06F 3/0354* | (2013.01) | |
| *G06F 3/044* | (2006.01) | |
| *G06F 3/01* | (2006.01) | |
| *G06F 3/0346* | (2013.01) | |
| *G06F 3/041* | (2006.01) | |

(52) U.S. Cl.
CPC .......... *G06F 3/03546* (2013.01); *G06F 3/016* (2013.01); *G06F 3/0346* (2013.01); *G06F 3/03542* (2013.01); *G06F 3/0412* (2013.01); *G06F 3/0442* (2019.05)

(58) Field of Classification Search
CPC .... G06F 1/1684; G06F 1/1686; G06F 1/1696; G06F 2203/0384; G06F 3/0346; G06F 3/03545; G06F 3/0386; G06F 3/0487; G06F 3/167; G06K 9/228
See application file for complete search history.

(56) References Cited

U.S. PATENT DOCUMENTS

| | | | |
|---|---|---|---|
| 9,470,792 B2 | 10/2016 | Giger | |
| 10,187,567 B2 | 1/2019 | Giger | |
| 10,378,881 B2* | 8/2019 | Hoelzlwimmer | .... G01C 15/002 |
| 2005/0140677 A1 | 6/2005 | Chou | |
| 2009/0322699 A1* | 12/2009 | Hansson | ................. G06F 3/045 |
| | | | 345/174 |
| 2014/0092069 A1* | 4/2014 | Bentov | ..................... G06F 1/26 |
| | | | 345/179 |
| 2015/0212602 A1 | 7/2015 | Lor et al. | |
| 2017/0177189 A1* | 6/2017 | Anvari | ................... G06K 9/228 |

FOREIGN PATENT DOCUMENTS

| | | | |
|---|---|---|---|
| EP | 2 618 105 A1 | 7/2013 | |
| EP | 2 669 707 A1 | 12/2013 | |
| EP | 2 918 972 A2 | 9/2015 | |

OTHER PUBLICATIONS

Extended European Search Report dated Mar. 28, 2019 as received in Application No. 18200805.2.

* cited by examiner

*Primary Examiner* — Ram A Mistry
(74) *Attorney, Agent, or Firm* — Maschoff Brennan

(57) ABSTRACT

A handheld stylus for the precise operation of a touch-sensitive display screen, comprising an oblong housing, which is designed in such a way that the stylus is provided to be held in one hand like a pen, and a tip, which is designed for touching the display screen, wherein the stylus comprises a laser distance meter integrated into the housing for measuring distances to spatial points along an emission direction.

16 Claims, 3 Drawing Sheets

STYLUS HAVING DISTANCE METER

CROSS-REFERENCE TO RELATED APPLICATIONS

This application claims priority to European Patent Application No. 18200805.2 filed on Oct. 16, 2018, which is incorporated herein by reference.

FIELD OF THE INVENTION

The invention relates to a stylus for the precise operation of a touch-sensitive display screen, for example, of a smart phone or tablet computer, wherein the stylus comprises an integrated laser distance meter. The invention additionally relates to a computer system having such a touch-sensitive display screen and such a stylus.

BACKGROUND

Handheld styluses (also "touch pens") for the precise operation of handheld small computers (such as smart phones or the like) via the touch-sensitive display screens (touchscreens) thereof are well known in the prior art.

Handheld distance measuring devices having laser distance meter are also known, which are designed for measuring distances to points in space by means of a laser beam emitted in an emission direction and the runtime method. Such distance meters are described, for example, in EP 2 669 707 A1 or EP 2 918 972 A2.

It is also known that such distance measuring devices can transmit the measurement data thereof to computers, where these data can be used, for example, for computing spatial models. Portable computers such as smart phones or tablet computers enable this directly at the location of the measurement. However, it is impractical to carry around multiple devices for this purpose.

SUMMARY

It is an object of some aspects of the present invention to provide an improved system made of distance meter and computer, in particular smart phone.

A further object of some embodiments is to provide such a system which enables simple operation by a user.

A further object of some embodiments is to provide such a system which can be held in the hand by a user both during a distance measurement and also during an input of data into the computer.

A further object of some embodiments is to provide a distance measuring functionality in a simple manner for existing handheld devices.

At least one of these objects is achieved by the implementation of the characterizing features of the independent claims. Advantageous embodiments of the invention are found in this case in the respectively dependent claims.

A handheld stylus according to some aspects of the invention for the precise operation of a touch-sensitive display screen comprises an oblong housing, which is designed in such a way that the stylus is provided to be held in one hand like a pen, and a tip, which is designed for touching the display screen. According to the invention, the stylus comprises a laser distance meter integrated into the housing for measuring distances to spatial points along an emission direction.

According to one embodiment of the stylus, the housing comprises a gripping region for at least thumb and index finger, and in particular also middle finger, of a user.

According to a further embodiment, the housing defines a housing longitudinal axis, and the emission direction is parallel to this housing longitudinal axis.

The stylus preferably comprises two ends, wherein the tip is located at a first end of the housing. According to one embodiment, the laser distance meter is positioned and designed for the purpose of emitting a laser beam at said first end of the housing in the emission direction. According to another embodiment, the laser distance meter is positioned and designed for the purpose of emitting the laser beam at a second end of the housing in the emission direction.

According to a further embodiment, the stylus comprises a data transmission unit for transmitting data via radio to an external computer, which comprises the touch-sensitive display screen. The data can be transmittable in particular by means of Bluetooth.

According to a further embodiment, the stylus comprises an analysis unit, which is designed to derive and provide measured distances.

According to a further embodiment, the stylus comprises an inertial measuring unit having acceleration sensors and rotation rate sensors.

According to one embodiment, said inertial measuring unit is designed for the purpose of acquiring movements of the stylus between a first distance measurement and a second distance measurement of the laser distance meter, in particular in six degrees of freedom.

According to one embodiment, said analysis unit is designed to derive and provide acquired movements of the stylus, to derive poses of the stylus based on the acquired movements, to compute and provide a distance between two spatial points measured by the first and the second distance measurement, and/or to compute and provide positions in a three-dimensional local coordinate system.

According to a further embodiment, the stylus comprises a display unit for displaying measured distances, in particular in the form of an OLED display.

According to a further embodiment, the stylus comprises a camera unit integrated into the housing for recording images in the direction of the emission direction.

According to a further embodiment of the stylus, the tip and the housing are conductive and are designed in such a way that the stylus is capable of operating a display screen designed as a capacitive touchscreen.

According to another embodiment, the stylus comprises a coil and is capable of operating a display screen designed as an inductive touchscreen.

A computer system according to some aspects of the invention comprises a computer having a touch-sensitive display screen and a stylus as described above, wherein the stylus is designed for the purpose of controlling functions of the computer by means of touching the display screen. The computer and the stylus are designed in this case according to the invention for transmitting data about measured distances from the stylus to the computer via radio.

According to one embodiment of the computer system, the computer is designed as handheld, wherein the display screen is integrated into a housing of the computer. The handheld computer can be designed in particular as a smart phone or tablet PC and can additionally comprise a receptacle for the stylus.

According to a further embodiment of the computer system, the computer and the stylus are designed for the mutual transmission of instructions from the stylus to the computer and from the computer to the stylus via radio, wherein the housing of the stylus can comprise a support region for the stable support of the stylus on a surface, in particular a magnetic support region for fixing the stylus on magnetic surfaces, and the display screen can provide a virtual switch for triggering a distance measurement.

An instruction can be, for example, the triggering of a distance measurement or the triggering of the recording of one or more images by means of the camera unit. It can thus be made possible for a user to position the stylus out of range for manual operation or without the necessity of holding it in the hand for a distance measurement and to trigger the distance measurement by means of actuation of the virtual switch on the display screen.

According to a further embodiment of the computer system, the stylus comprises a camera unit for recording images, and the computer and the stylus are designed for transmitting image data of images recorded by the camera unit from the stylus to the computer via radio. In this case, the computer system can be configured can for the purpose of displaying recorded image data as images on the display screen.

In this context, an instruction can also be the triggering of an image recording and its transmission, in particular a continuous image transmission, for example, in the form of a video stream. The recorded image or the video stream can permit the user, for example, to display the spatial point targeted for the distance measurement on the display screen, in particular in a representation enlarged in comparison to the perception with the naked eye.

According to a further embodiment of the computer system, the stylus can comprise a haptic feedback module, and the computer system can be configured for the purpose of signaling in a haptic manner a successful transmission of data relating to a measured distance from the stylus to the computer via radio by means of the haptic feedback module.

According to one embodiment of the computer system, it can be configured for the purpose of providing a first and a second distance measuring mode as selectable when a stylus is located in the receptacle, wherein upon selection of the first distance measuring mode, upon triggering of a distance measurement, a distance from a first housing edge of the computer to a spatial point is measured by means of the distance meter of the stylus, and upon selection of the second distance measuring mode, upon triggering of a distance measurement, a distance from a second housing edge of the computer, which is opposite to the first housing edge, to a spatial point is measured by means of the distance meter of the stylus, and the computer comprises at least one switch for triggering a distance measurement, in particular wherein the switch is located on the housing of the computer, or the display screen provides a virtual switch. The first and the second housing edges are arranged roughly perpendicularly in relation to the emission direction on respectively the first or second end of the stylus.

BRIEF DESCRIPTION OF THE DRAWINGS

The stylus according to some embodiments of the invention and the computer system according to the invention are described in greater detail solely by way of example hereafter on the basis of specific exemplary embodiments schematically illustrated in the figures, wherein further advantages of the invention are also discussed. In the individual figures.

DETAILED DESCRIPTION

Figure 1:
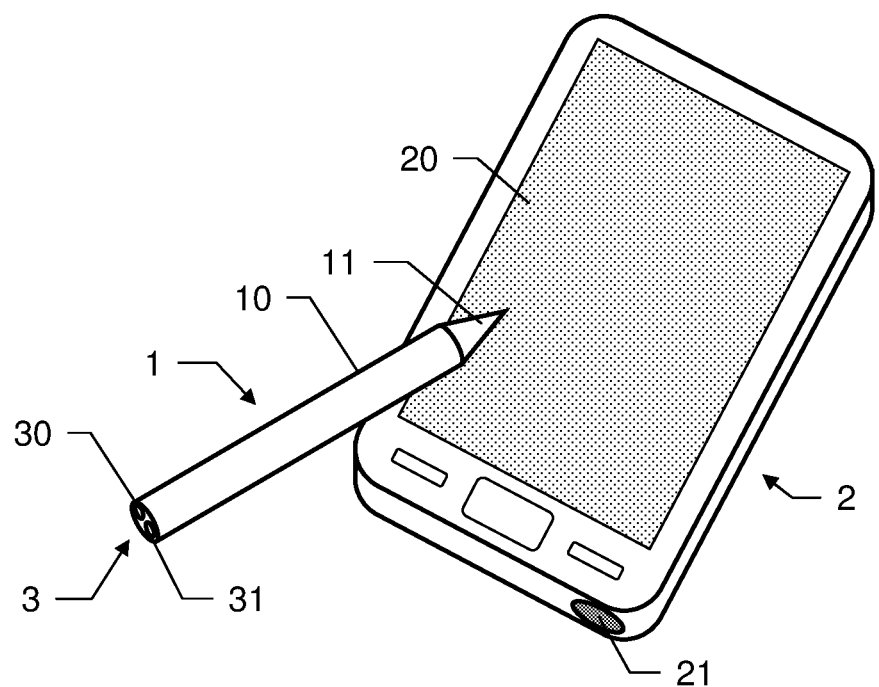
FIG. 1 shows a first exemplary embodiment of a stylus according to the invention and a smart phone having a touchscreen.

FIG. 1 shows a first exemplary embodiment of a stylus 1 according to the invention. It comprises an oblong housing 10, on one end of which a tip 11 is located, which is designed for operating a touch-sensitive display screen 20 (touchscreen) of a handheld computer, which is designed as a smart phone 2, to control functions of the computer. The housing 10 can consist, for example, of a hard plastic and the tip 11 can consist of a softer plastic. While the housing is thus hard and is firmly gripped, the tip 11 is designed for the purpose of touching the display screen 20 as gently as possible, in particular without any risk of producing scratches.

At the end opposite to the tip 11, a laser distance meter 3 is integrated into the housing 10 having a laser emission module 30, which is designed to emit a measurement beam onto a measurement point (not shown here), and a receiving optical unit 31 for receiving measurement radiation backscattered from the measurement point. Stylus 1 and smart phone 2 can be designed in particular as a system, wherein the smart phone 2 comprises a receptacle 21 for the stylus 1.

Like conventional styluses, a stylus 1 according to the invention can also can be designed for operating different touchscreens. If the touch-sensitive display screen 20 is designed as a capacitive touchscreen, both the housing 10 and also the tip 11 of the stylus 1 are designed as at least partially conductive. If it is an inductive touchscreen, a corresponding coil is integrated into the stylus 1. No special components are required for the use with resistive touchscreens; the tip can preferably be rubberized.

Figure 2:
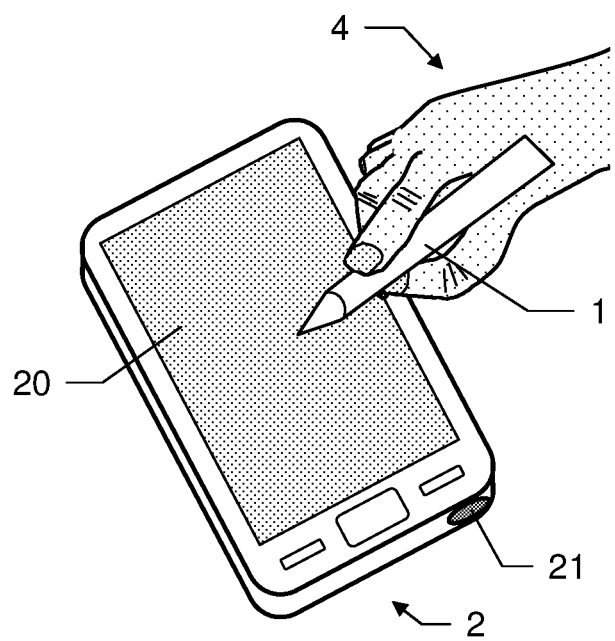
FIG. 2 shows a use of the stylus from FIG. 1 for operating the touchscreen.

FIG. 2 shows the stylus 1 and the smart phone 2 from FIG. 1 during the use of the stylus 1 for operating the display screen 20 of the smart phone 2. The housing of the stylus 1 is designed in such a way that it can be held like a pen using one hand 4 of a user. The stylus 1 preferably has for this purpose on its housing a specially designed gripping region for at least thumb and index finger, and in particular also the middle finger, of the hand 4.

Advantageously, a more precise operation is generally possible using styluses than using the fingers, for example, drawings can be prepared with pixel accuracy. Moreover, styluses can be used for preparing handwritten notes. Several styluses of the prior art can also measure pressure and inclination during the operation of the touchscreen and can transmit the corresponding values to the computer.

Furthermore, soiling on the display screen 20 by fingerprints is prevented by use of the stylus 1.

Figure 3:
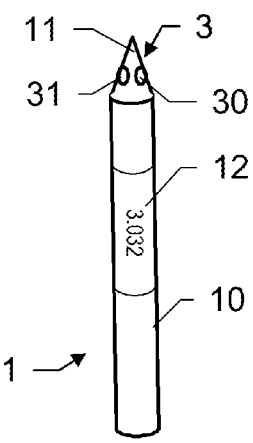
FIG. 3 shows a second exemplary embodiment of a stylus according to the invention.

FIG. 3 shows a second exemplary embodiment of a stylus 1 according to the invention. The laser distance meter 3 having laser emission module 30 and receiving optical unit 31 is provided therein on the same end of the housing 10 as the tip 11 for operating the display screen. In addition, the stylus 1 comprises a display unit 12, particularly advantageously for displaying measured distances. In particular if the housing 10 is round and thus the display unit 12 applied thereto is also, the display unit 12 is preferably designed as an OLED display (OLED=organic light-emitting diode).

To be able to display measured distances, the stylus 1 comprises an analysis unit, which is associated with the laser distance meter 3 and is designed for deriving and providing the distances measured by means of the laser distance meter 3.

Figure 4:
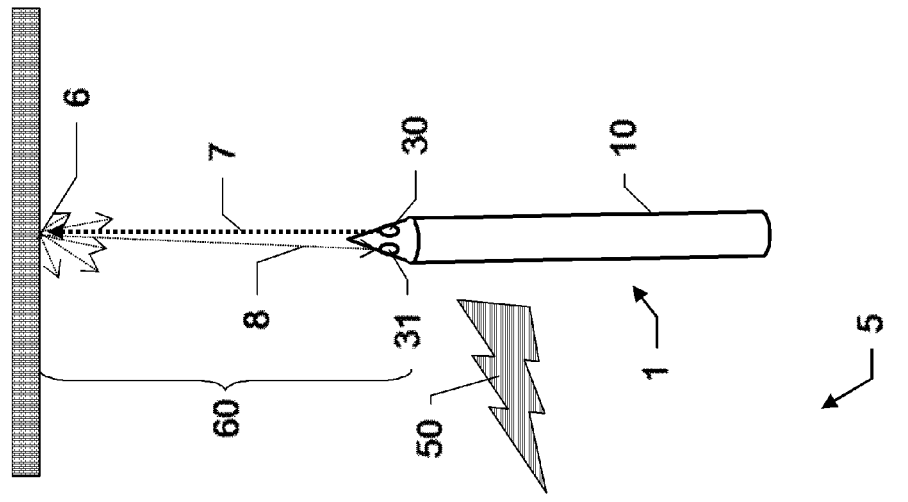
FIG. 4 shows a use of the stylus for measuring and deriving distances.
Figure 4:
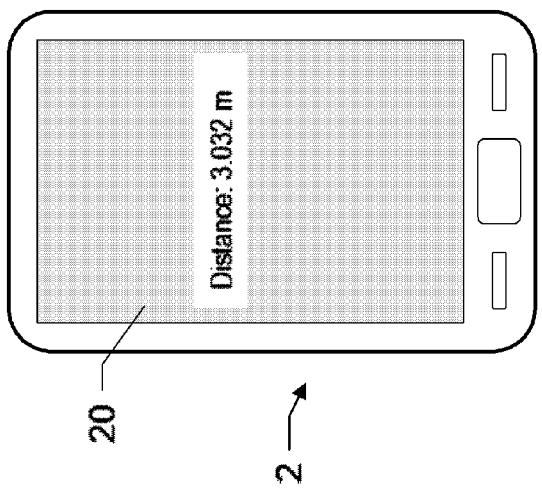

FIG. 4 illustrates the use of the stylus 1 for distance measurement by means of the laser distance meter 3. The laser distance meter 3 comprises a laser emission unit 30 and a laser reception unit 31, which have optical openings in the housing of the stylus 1. Alternatively, the laser distance meter 3 can also comprise a coaxial optical unit, i.e., a shared opening for emitting and receiving the measurement radiation, which can be advantageous in particular because of the necessarily compact construction for housing in the stylus.

For triggering of a distance measurement by the user, the stylus 1 comprises corresponding switches, which are preferably positioned so that they are not inadvertently operated during the use as an input means when the stylus 1 is held like a pen.

The laser emission unit 30 emits a laser beam 7 as measurement radiation to a measurement point 6 on a wall, and preferably generates a visible point there. The wall comprises a naturally rough surface, from which optical beams are reflected in a scattering manner. A part of the beams 8, which are reflected in a scattered manner, of the laser beam 7 is collected by the laser receiving unit 31, detected, and converted into an electrical signal. The signal is analyzed by an electronic circuit in a manner known per se to determine the digital value of the distance 60. For example, phase measurement or runtime measurement can be used for the distance ascertainment. The extension between the laser receiving unit 31 and a measurement stop is also taken into consideration in this case. The value of the measured distance 60 digitally determined by the analysis can then be provided to a user, for example, by a display unit (not shown here).

The stylus 1 is shown during the measurement of a distance 60 to a first point 6 and a distance 61 to a second point 6' on a wall. For the measurement to the second point 6', the location of the stylus 1 is changed by the user in relation to that for measuring the first point 6. If the location change can be acquired in addition to the distances 60, 61 to the two measurement points 6, 6', a distance 62 between the two points 6, 6' can be computed. To ascertain the location change in six degrees of freedom, the stylus 1 can in particular comprise an inertial measuring unit having acceleration and rotation rate sensors.

Figure 5:
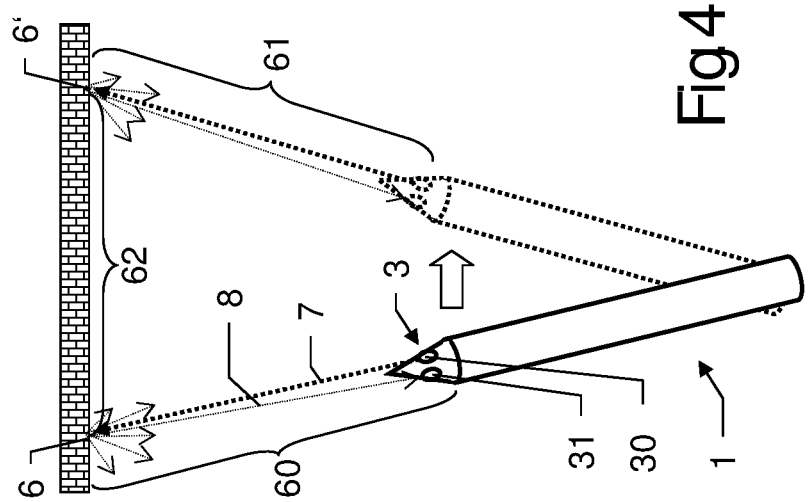
FIG. 5 shows a system made of stylus and handheld computer.

FIG. 5 shows a system 5 made of stylus 1 and computer unit 2. These are each designed for mutual data transmission 50. In particular, data about measured distances 60—either as raw data or already as derived distance values—can be transmitted from the stylus 1 to the computer 2. The transmission 50 can take place wirelessly as shown here, for example, by means of Bluetooth, near-field communication, or a WLAN network. The data transmission can also likewise take place by means of USB cable, however, via which a power supply of the laser distance meter 3 can then also be ensured. The measured distance 60 to the measurement point 6 can then be displayed to the user on the display screen 20 of the computer 2.

By means of the stylus 1, distances can be incorporated into a spatial model or a construction plan, for example, assigned to specific sections. Such a spatial model or such a construction plan can also be prepared directly on the device, for example, as described in the two documents US 2005/0140677 A1 or EP 2 618 105 B1. Length specifications for individual segments can then be both ascertained and also assigned using the stylus.

The wireless transmission 50 can also include a mutual transmission of instructions between stylus 1 and computer 2. The display screen can provide for this purpose a virtual switch for triggering a distance measurement. Thus, for example, a user can trigger a distance measurement on the computer 2, while the stylus 1 is placed on a surface or fastened on a wall out of range of the user. The stylus can preferably comprise in this case a support region for the stable support on a surface or also a magnetic support region for fixing the stylus on magnetic surfaces.

The stylus 1 can optionally comprise a camera unit for recording images (not shown here). The wireless transmission 50 can comprise in this case a transmission of image data of the images recorded by the camera unit from the stylus 1 to the computer 2. The recorded image data can subsequently be displayed as images on the display screen.

Furthermore, the stylus 1 can comprise a haptic feedback module, which enables haptic feedback for a user of the stylus, for example, in the form of a vibration alarm. In this case, the wireless transmission 50 can comprise a signal from the computer 2 to the stylus 1 to trigger the haptic feedback. For example, a successful transmission 50 of data relating to a measured distance from the stylus 1 can thus be signaled to the computer 2.

Figure 6:
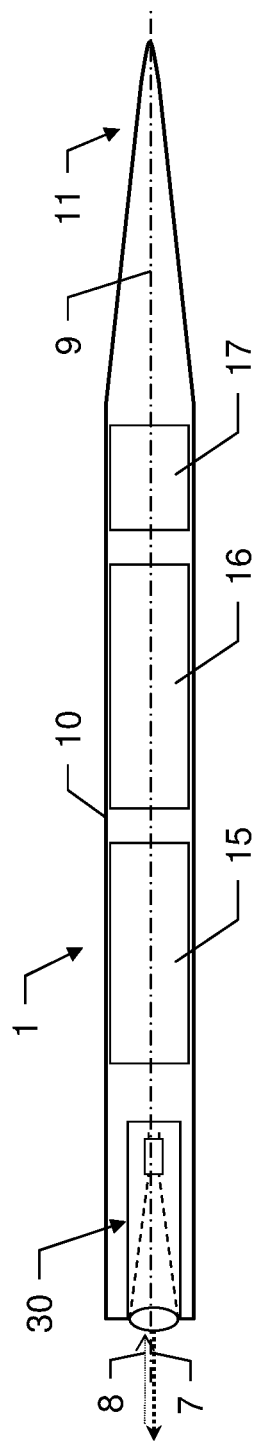
FIG. 6 shows a longitudinal section through an exemplary embodiment of a stylus according to the invention.

FIG. 6 shows a longitudinal section through an exemplary embodiment of the stylus 1 to illustrate internal components. In the embodiment shown, the laser distance meter 3 is located on the side of the stylus opposite to the tip 11. The oblong housing 10 of the stylus defines a longitudinal axis 9. The laser distance meter 3 is positioned and designed in such a way that the emission direction of the measurement radiation 7 is parallel to the housing longitudinal axis 9. The stylus comprises a button 35 for triggering a distance measurement.

In the interior of the housing 10, a data transmission unit 15, an analysis unit 16, and an inertial measuring unit 17 are illustrated by way of example.

Moreover, the stylus comprises a power supply unit, in particular having a battery and a connection for the charging thereof (not shown here). The charging can be performed, for example, by means of USB cable. Alternatively, the battery of the stylus 1 can be charged via electrical contacts in the housing 10 or by means of induction if it is incorporated into a receptacle 21 (cf. FIG. 1) of a computer designed, for example, as a smart phone. Alternatively, a battery compartment can also be provided.

The data transmission unit 15 is designed for transmitting data via radio to an external computer, in particular by means of Bluetooth. The analysis unit 16 is designed for deriving and providing measured distances, for example, for a display unit of the stylus 1 (cf. FIG. 3). The inertial measuring unit 17 comprises acceleration and rotation rate sensors and is in particular designed for the purpose of acquiring movements of the stylus 1 between a first distance measurement and a second distance measurement of the laser distance meter 30 in six degrees of freedom.

Optionally, the computer system can be configured to also carry out distance measurements when the stylus 1 is inserted into the receptacle 21 of the handheld computer 2 (cf. FIG. 1). For this purpose, the computer 2 can comprise means for triggering a distance measurement, for example, in the form of a switch on the housing of the computer or in the form of a virtual switch, which is provided on the display screen. In this case, two distance measuring modes can advantageously be provided as selectable for a user. Upon selection of the first distance measuring mode, upon triggering of a distance measurement by means of the distance meter of the stylus 1, a distance from a first housing edge of the computer 2 to a spatial point can be measured, i.e., from the edge of the computer on which the receptacle is located. Upon selection of the second distance measuring mode, by means of the distance meter of the stylus 1, a distance from a second housing edge, which is opposite to the first housing edge, of the computer 2 to a spatial point can be measured. In particular, in this case a known length of the computer 2 between the first and the second edge can be added to the distance measurement.

It is apparent that these illustrated figures only schematically illustrate possible exemplary embodiments. The various approaches can also be combined with one another and with methods and devices of the prior art.

What is claimed is:

1. A handheld stylus for the precise operation of a touch-sensitive display screen, the handheld stylus comprising:
    an oblong housing, which is designed in such a way that the stylus is held in one hand like a pen, the housing defining a longitudinal axis,
    a tip, which is located at a first end of the housing and designed for touching the display screen, and
    a laser distance meter, which is integrated into the housing at a second end of the housing and configured to emit a laser beam into an emission direction that is parallel to the longitudinal axis for measuring distances to spatial points along the emission direction,
    wherein the tip and the housing are conductive and are designed in such a way that the stylus is capable of operating a display screen designed as a capacitive touchscreen.

2. The stylus according to claim 1, wherein the housing comprises a gripping region for at least thumb and index finger of a user.

3. The stylus according to claim 1, further comprising a data transmission unit for transmitting data via radio to an external computer, which comprises the touch-sensitive display screen.

4. The stylus according to claim 1, further comprising an analysis unit, designed for deriving and providing measured distances.

5. The stylus according to claim 1, further comprising an inertial measuring unit, comprising acceleration sensors and rotation rate sensors, wherein the inertial measuring unit is designed for the purpose of acquiring movements of the stylus between a first distance measurement and a second distance measurement of the laser distance meter.

6. The stylus according to claim 1, further comprising a display unit for displaying measured distances.

7. The stylus according to claim 1, further comprising a camera unit integrated into the housing for recording images in the direction of the emission direction.

8. A computer system comprising a computer and a stylus, the computer comprising a touch-sensitive display screen and a receptacle for the stylus,
    the stylus comprising an oblong housing with a tip, wherein the housing is designed in such a way that the stylus can be held in one hand like a pen, and the tip is designed for touching the display screen, and
    wherein the stylus comprises a laser distance meter integrated into the housing for measuring distances to spatial points along an emission direction, and is designed for the purpose of controlling functions of the computer by means of touching the display screen,
    wherein the computer and the stylus are designed for transmitting data about measured distances from the stylus to the computer via radio,
    wherein the computer system is configured for providing a first and a second distance measuring mode, when the stylus is located in the receptacle, wherein:
    upon selection of the first distance measuring mode and upon triggering of a distance measurement, a distance from a first housing edge of the computer to a spatial point is measured by means of the distance meter of the stylus,
    upon selection of the second distance measuring mode and upon triggering of a distance measurement, a distance from a second housing edge, which is opposite to the first housing edge, of the computer to a spatial point is measured by means of the distance meter of the stylus, and
    the computer comprises at least one switch for triggering a distance measurement.

9. The computer system according to claim 8, wherein the computer is designed as handheld, and wherein the display screen is integrated into a housing of the computer.

10. The computer system according to claim 8, wherein the computer and the stylus are designed for mutually transmitting instructions via radio, wherein the housing of the stylus comprises a support region for the stable support of the stylus on a surface, and the display screen provides a virtual switch for triggering a distance measurement.

11. The computer system according to claim 8, wherein:
    the stylus comprises a camera unit for recording images,
    the computer and the stylus are designed for transmitting image data of images recorded by the camera unit from the stylus to the computer via radio, and
    the computer system is configured for the purpose of displaying recorded image data as images on the display screen.

12. The computer system according to claim 8, wherein the stylus comprises a haptic feedback module, and the computer system is configured for the purpose of signaling in a haptic manner a successful transmission of data relating to a measured distance from the stylus to the computer via radio by means of the haptic feedback module.

13. A handheld stylus for the precise operation of a touch-sensitive display screen, the handheld stylus comprising:
    an oblong housing, which is designed in such a way that the stylus is held in one hand like a pen, and
    a tip, which is designed for touching the display screen, wherein the stylus comprises a laser distance meter integrated into the housing for measuring distances to spatial points along an emission direction, and a display unit for displaying measured distances,
    wherein the tip and the housing are conductive and are designed in such a way that the stylus is capable of operating a display screen designed as a capacitive touchscreen.

14. The stylus according to claim 13, wherein the housing comprises a gripping region for at least thumb and index finger of a user.

15. The stylus according to claim 13, further comprising a data transmission unit for transmitting data via radio to an external computer, which comprises the touch-sensitive display screen.

16. The stylus according to claim 13, further comprising a camera unit integrated into the housing configured for recording images in the direction of the emission direction.

* * * * *